April 15, 1924.
F. G. MATSON
BAKING MOLD
Filed March 23, 1923
1,490,177
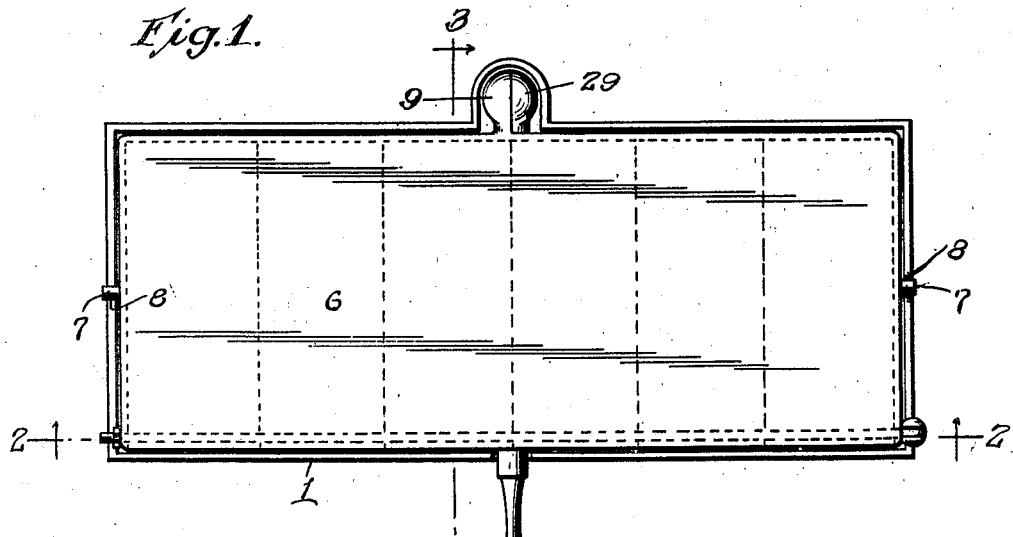
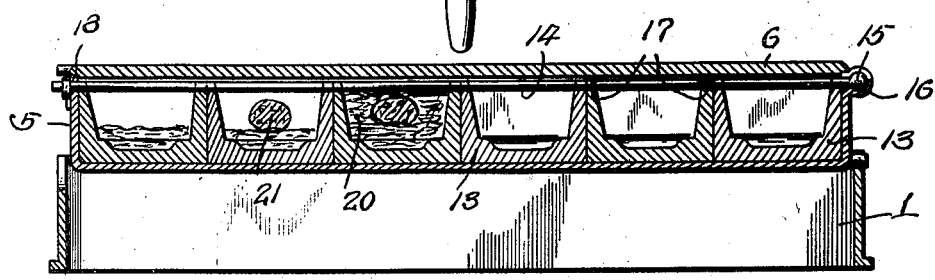
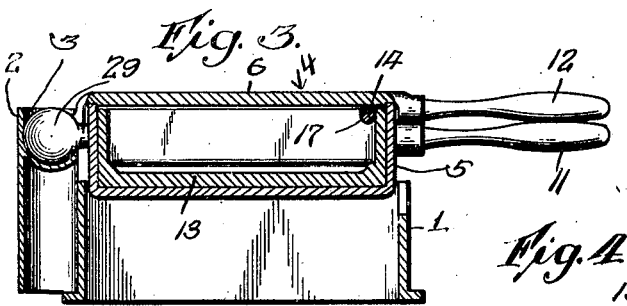
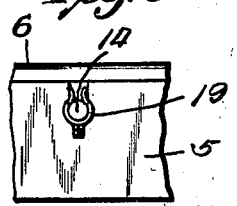
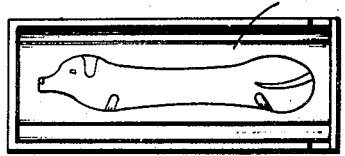
Inventor
Francis G. Matson
By Percy H. Moore
Atty.

Patented Apr. 15, 1924.

1,490,177

UNITED STATES PATENT OFFICE.

FRANCIS G. MATSON, OF WASHINGTON, DISTRICT OF COLUMBIA.

BAKING MOLD.

Application filed March 23, 1923. Serial No. 627,173.

*To all whom it may concern:*

Be it known that FRANCIS G. MATSON, a citizen of the United States of America, residing at Washington, District of Columbia, has invented certain new and useful Improvements in Baking Molds, of which the following is a specification.

The object of my invention is to provide an inexpensive baking mold for making the edible food product disclosed in my copending application Serial Number 627,171 filed of even date herewith.

Other and further objects and advantages of the invention will be in part apparent and in part described as the specification is proceeded with.

In the accompanying drawings wherein I have illustrated a preferred embodiment of my invention:

Figure 1 is a plan view of the invention;

Figure 2 is a section on the line 2—2 of Figure 1;

Figure 3 is a section on the line 3—3 of Figure 1;

Figure 4 is a plan view of one of the removable mold sections;

Figure 5 is a fragmentary detail end view of the invention.

Referring more particularly to the drawings wherein like reference numerals designate corresponding parts throughout the several views 1, denotes an open ended substantially rectangular base portion adapted to rest on the top of an oil or other cook stove (not shown).

The base portion 1, is provided with a tubular boss 2, intermediate the length of one side wall thereof. This boss 2, is formed in its upper end with a socket 3, for a purpose presently to be described.

A two part baking mold 4, comprising the substantially rectangular dish shaped female member 5, and the male or cover member 6, is normally supported upon the base in nested relation thereto by lugs 7, projecting from the end walls of the dish shaped member 5, adapted to seat in corresponding notches or recesses 8, in the end walls of the base. It will be understood that the dimensions of the member 5, are slightly less than that of the base 1.

Projecting from the rear wall of the member 5, and from the member 6, are two semi-spherical hinge members 9 and 29 respectively. When the mold member 6, is in Figure 3 or closed position the flat opposing faces of the two semi-spherical members are in abutting relation with each other and form a sphere or ball adapted to seat in the socket 3. It will thus be seen that by means of the handles 11 and 12 on the mold members 5 and 6 respectively, that the mold as a whole can be tilted upwardly and then turned completely over until the top or male member 6, will be subjected directly to the heat coming up through the base 1. During this movement the semi-spherical members 9 and 29 seated in the socket 3, will serve as a pivot. It will also be apparent that the cover member 6, can be swung to open position, the semi-spherical member 29 and the socket 3, forming the pivot during this movement.

Seated within the female member 5, of the mold 4, are a plurality of dish shaped die members 13, transversely disposed with respect to the mold members. These die members are removably held in place by a rod 14, having a ball 15, swiveled in a slotted ear 16, formed on the forward corner of one end wall of the mold member 5. The rod 14, seats in notches 17, in the dies 13, and projects through a notch 18, in the other end wall of the member 5, where it is normally locked by a spring catch 19.

When it is desired to replace broken or worn die members 13 or to replace those in use with others of different design all that is necessary is to swing open the top member 6, of the mold, unlatch the free end of the rod 14, and lift the latter out of the notches 17 and 18.

In use the die members 13 which bear a suitable design on their bottom inner face, are partially filled with a batter or dough 20, upon which a Frankfurter sausage 21, is placed. The sausage is then covered with dough and the whole baked by placing the base 1 upon a stove (not shown). After one side of the edible has been cooked the mold as a whole is turned in the manner previously described and the other side is then baked.

Having thus described my invention what I claim as my invention is:

A baking mold comprising a base, a female substantially dish shaped mold member supported on said base, a slotted ear on one end wall of said mold member, the other end wall thereof being formed with a notch and a spring catch adjacent said notch, a plurality of dish shaped die members in said mold member having notches in the side wall thereof, and a rod adapted to seat in the last mentioned notches, said rod formed with a ball at one end swiveled in said apertured ear, the other end of said rod normally projecting through the notch in the end wall of said mold member and engaged by said spring catch.

In testimony whereof I affix my signature in presence of two witnesses.

FRANCIS G. MATSON.

Witnesses:
 MELVIN D. HILDRETH,
 GUY MASON.